(12) United States Patent
Nishitani

(10) Patent No.: US 7,641,751 B2
(45) Date of Patent: Jan. 5, 2010

(54) PRODUCING METHOD OF PNEUMATIC TIRE

(75) Inventor: Kazuma Nishitani, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 519 days.

(21) Appl. No.: 11/382,985

(22) Filed: May 12, 2006

(65) Prior Publication Data

US 2006/0174995 A1 Aug. 10, 2006

(30) Foreign Application Priority Data

May 16, 2005 (JP) ............... 2005-142766

(51) Int. Cl.
  *B29D 30/72* (2006.01)
(52) U.S. Cl. .............. 156/116; 152/524; 156/117; 156/130.7
(58) Field of Classification Search ......... 156/116, 156/117, 130.7; 152/523, 524, DIG. 12
  See application file for complete search history.

(56) References Cited

U.S. PATENT DOCUMENTS 3,508,595 A * 4/1970 Wilson ............... 152/524
2003/0102088 A1 * 6/2003 Iiduka ............... 156/394.1
2006/0048878 A1 * 3/2006 Ogawa ............... 152/524

FOREIGN PATENT DOCUMENTS

| JP | 9-1694 | | 1/1997 |
| JP | 2000-94542 A | * | 4/2000 |
| WO | WO 2004/037524 A1 | | 5/2004 |

* cited by examiner

*Primary Examiner*—Geoffrey L Knable
(74) *Attorney, Agent, or Firm*—Knobbe Martens Olson & Bear LLP

(57) ABSTRACT

When a sidewall portion is formed with a white line or character having different color from that of a main body rubber, a rubber ribbon is wound along a circumferential direction of the tire a plurality of times, a black sidewall rubber provided with a concave groove extending in the circumferential direction of the tire is formed in a region where the white line or character is to be formed, an integrally extruded white rubber extrudate is fitted into the concave groove, the white rubber extrudate is covered with a black rubber sheet, the rubber sheet is partially cut down to expose the white rubber extrudate.

6 Claims, 3 Drawing Sheets

PRODUCING METHOD OF PNEUMATIC TIRE

BACKGROUND OF THE INVENTION

1. Field of the Invention

The present invention relates to a producing method of a pneumatic tire having a sidewall portion formed with a line or a character of color different from that of a main body rubber.

2. Description of the Related Art

Conventionally, to enhance the fashion, there is a known pneumatic tire having a sidewall portion formed with a line or a character of color different from that of a main body rubber. For example, in a sidewall portion 31 shown in FIG. 6, a black rubber layer 7 having the same color as that of a main body rubber and a white rubber layer 8 having a different color from that of the main body rubber are disposed. A thin cover rubber layer 9 having the same color as that of the main body rubber is disposed on an outer side of the white rubber layer 8. After vulcanization, if the cover rubber layer 9 is partially cut down by buffing to expose the white rubber layer 8, a white line or character can be formed on the sidewall portion 2 (see the following Japanese Patent Application Laid-open No. 9-1694).

A sidewall rubber constituting the sidewall portion is formed by an extrusion method or a ribbon winding method. According to the former method, a rubber extrudate having a predetermined cross section shape is integrally extruded, the rubber extrudate is wound along a circumferential direction of a tire once to constitute a sidewall rubber. However, since it is necessary to prepare a large number of sidewall rubber members corresponding to various tire sizes, there is a problem that the number of parts is increased, and since a step is generated in a joint portion, uniformity of tires is deteriorated.

According to the latter method, on the other hand, a rubber ribbon having small width and small thickness is wound along the circumferential direction of the tire a plurality of times to constitute the sidewall rubber. Therefore, the uniformity of tires is excellent, and the number of parts can be reduced. However, when a sidewall portion is formed with a line or a character of color different from that of a main body rubber, if the cover rubber layer is cut down by buffing, a profile of this portion becomes wavy along a cross section of the rubber ribbon in some cases, and there is a problem that an outward appearance of the tire is deteriorated. In the following International Publication No. 04/037524 Brochure, there is proposed a method in which a sidewall rubber is formed by ribbon winding method, a rubber sheet is wound once to form a cover rubber layer, and a portion of the cover rubber layer to be cut down is formed with a convex shape at the time of vulcanization. However, its profile becomes wavy along the cross section of a rubber ribbon having a color different from that of a main body rubber in some cases.

SUMMARY OF THE INVENTION

Hence, it is an object of the present invention to provide a producing method of a pneumatic tire capable of preventing a profile of the line or character from becoming wavy while making full use of merits of the ribbon winding method when a sidewall portion of a pneumatic tire is formed with a line or a character of color different from that of a main body rubber.

The object can be achieved by the present invention having the following structure. That is, the present invention provides a producing method of a pneumatic tire in which at least one side of a sidewall portion is formed with a second color portion of second color that is different from that of a main body rubber of first color, the producing method comprising steps of: winding a rubber ribbon of the first color along a circumferential direction of the tire a plurality of times, thereby forming a first color sidewall rubber in which a concave groove extending in the circumferential direction of the tire is provided in a region where the second color portion is formed; fitting a second color rubber extrudate of the second color which is integrally extruded into the concave groove and once winding the same along the circumferential direction of the tire; once winding a rubber sheet of the first color along the circumferential direction of the tire to cover the second color rubber extrudate with the rubber sheet; and partially cutting down the rubber sheet to expose the second color rubber extrudate to form the second color portion.

According to the producing method of the pneumatic tire of the present invention, the integrally extruded second color rubber extrudate is once wound in the circumferential direction of the tire, the rubber sheet covering the second color rubber extrudate is partially cut down, thereby forming the second color portion. Therefore, the profile of the second color portion of the line or character does not become wavy, and excellent outward appearance of the tire can be obtained. The second color rubber extrudate is fitted into the concave groove of the first color sidewall rubber, the positioning operation can easily and reliably be carried out. In the first color sidewall rubber, since the rubber ribbon is wound a plurality of times along the circumferential direction of the tire, it is possible to make full use of the merits of the ribbon winding method, the uniformity is excellent, and the number of parts can be reduced. It is possible to easily change the position of the second color portion in accordance with a kind of tire, and this can also reduce the number of parts. The main body rubber in this invention is a rubber constituting most portion of the tire, and the main body rubber is usually black.

In the above method, it is preferable that a width size of the concave groove is increased toward its opening side. With this structure, it becomes easy to fit the second color rubber extrudate into the concave groove, and the operability is enhanced. Examples of a cross section shape of the concave groove when it is cut along the tire meridian is a reversed triangular shape, a semi-circular shape and a trapezoidal shape having an upper side longer than a lower side.

In the above method, it is preferable that a cross section shape of the concave groove when it is cut at a tire meridian is of substantially trapezoidal shape, a thickness of an end formed by an opening surface and a side surface of the concave groove is 1 mm or less, and an angle formed between the side surface and a bottom surface of the concave groove is 105° or more. When the cross section shape of the concave groove is of substantially trapezoidal shape, if the thickness of the end formed by the opening surface and the side surface of the concave groove is 1 mm or less, a surface step generated in a boundary between the first color sidewall rubber and the second color rubber extrudate which is fitted into the concave groove is reduced, and procedure failure can be prevented. If the angle formed between the side surface and the bottom surface of the concave groove is 105° or more, air in the concave groove can easily escape when the second color rubber extrudate is fitted into the concave groove, and the procedure failure caused by the entering air can be prevented.

In the above method, it is preferable that when the second color rubber extrudate is covered with the rubber sheet, a projection provided on a covered surface of the rubber sheet is opposed to an opening edge of the concave groove. According to this structure, the surface step generated in the boundary between the first color sidewall rubber and the second color rubber extrudate fitted into the concave groove can be reduced by the projection, while covering the second color rubber extrudate with the rubber sheet, and the procedure failure can effectively be prevented.

DESCRIPTION OF THE PREFERRED EMBODIMENTS

Figure 1:
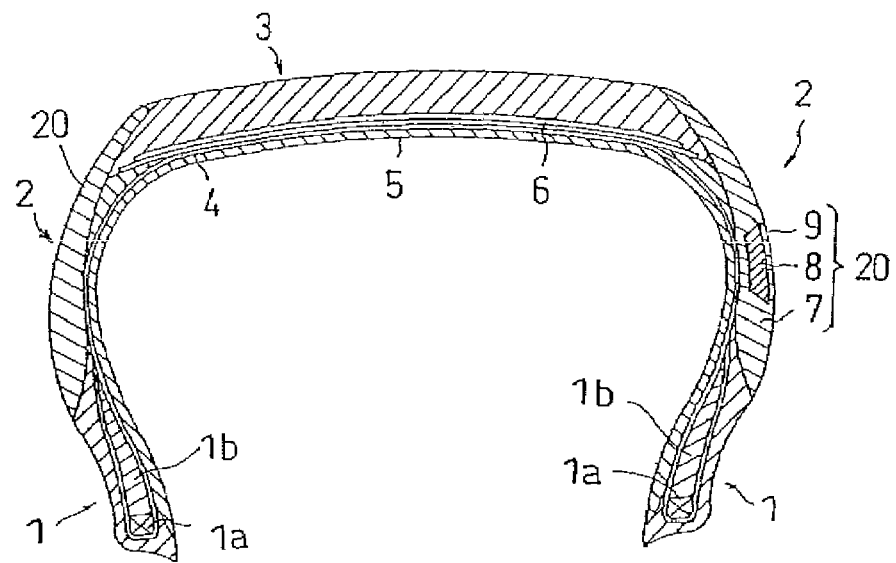
FIG. 1 is a sectional view of a tire meridian showing one example of a pneumatic tire before vulcanization.

An embodiment of the present invention will be explained with reference to the drawings. FIG. 1 is a sectional view of a tire meridian showing one example of a pneumatic tire before vulcanization. The pneumatic tire comprises a pair of bead portions 1 in which a bead 1a and a bead filler 1b which are converged body of bead wires are disposed, sidewall portions 2 extending radially outward of the tire from the bead portion 1, and a tread portion 3 provided between the sidewall portions 2.

The carcass layer 4 includes at least one carcass ply comprising a ply cord extending at an angle of about 90° with respect to a tire equator. The carcass ply extends between the pair of bead portions 1, and an end of the carcass ply is wound back outside through the bead 1a. An inner liner rubber 5 for maintaining air pressure is disposed on the inner peripheral side of the carcass layer 4. A belt layer 6 for reinforcing using hoop effect is disposed on the outer peripheral side of the carcass layer 4. This tire structure is the same as that of a general pneumatic tire, and the present invention can be applied to any of tires having a sidewall portion 2 formed with a line or character of color different from that of a main body rubber.

The pneumatic tire comprises a plurality of rubber members. A sidewall rubber 20 is disposed on the sidewall portion 2. In this embodiment, a white rubber layer 8 of white color (corresponding to the second color) that is different from that of the main body rubber is disposed on the right sidewall portion 2 in FIG. 1. The white rubber layers 8 need not always be disposed on both side sidewall portions 2, and in this embodiment, the white rubber layer 8 is disposed on the side of the tire that comes outside a vehicle when the tire is mounted (right side in FIG. 1).

The white rubber layer 8 is disposed in an annular form along a circumferential direction of the tire with a constant width. The cover rubber layer 9 is black (corresponding to the first color) like the main body rubber. The cover rubber layer 9 is thin and disposed outside of the white rubber layer 8. Black rubber layers 7 having the same color as that of the main body rubber are disposed on other portions of the sidewall portion 2. The black rubber layer 7, the white rubber layer 8 and the cover rubber layer 9 respectively comprise a later-described black sidewall rubber 10 (corresponding to the first color sidewall rubber), a white rubber extrudate 11 (corresponding to the second color rubber extrudate) and a rubber sheet 12.

In the producing method of the pneumatic tire according to the present invention, conventional known methods can be employed except a step concerning the sidewall portion. For example, the inner liner rubber 5 is pasted on an outer periphery of a forming drum to form the inner liner rubber 5 into a cylindrical shape, and a carcass ply constituting the carcass layer 4 is pasted on its outer periphery. Then, the annular bead 1a is inserted over an end area of the carcass ply, and an end of the carcass ply is wound back outward through the bead 1a. Then, a sidewall rubber 20 is pasted on the outer periphery of the carcass ply together with other rubber members, and a central portion of the carcass ply is swelled and deformed along a tire shape. A belt layer 6 and a tread rubber are disposed on a tread portion, the tire is constituted as shown in FIG. 1 and then, vulcanization is carried out.

Figure 2:
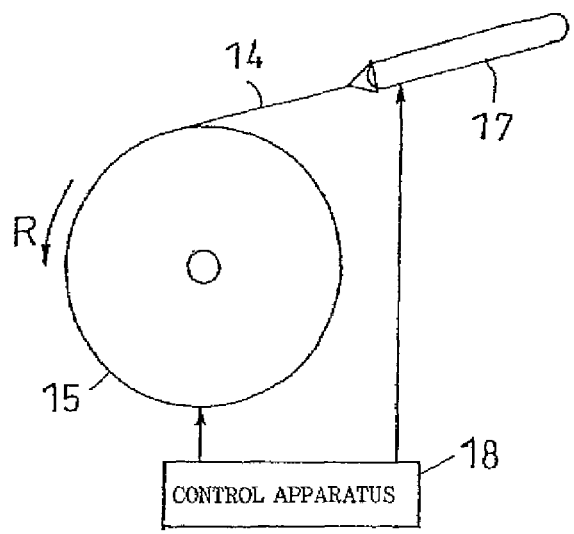
FIG. 2 is a diagram showing a structure of an apparatus used for forming a sidewall rubber.

Formation of the sidewall rubber 20 will be explained below. FIG. 2 shows an example of a structure of an apparatus used for forming the sidewall rubber 20. This apparatus includes an extruding apparatus 17, a forming drum 15 and a control apparatus 18. The extruding apparatus 17 includes an extruder. A capsule is mounted on a tip end of the extruder in the extruding direction. An unvulcanized rubber composition mixed by the extruder is continuously extruded through the capsule in a form of a rubber ribbon 14, and this is supplied to the forming drum 15. The forming drum 15 can rotate in an R-direction and can reciprocate in a direction of a rotation axis (direction perpendicular to a paper sheet of FIG. 2). The forming drum 15 is rotated and moved in the direction of the rotation axis respectively by driving apparatuses (not shown), and these driving apparatuses are controlled by the control apparatus 18.

Figure 3:
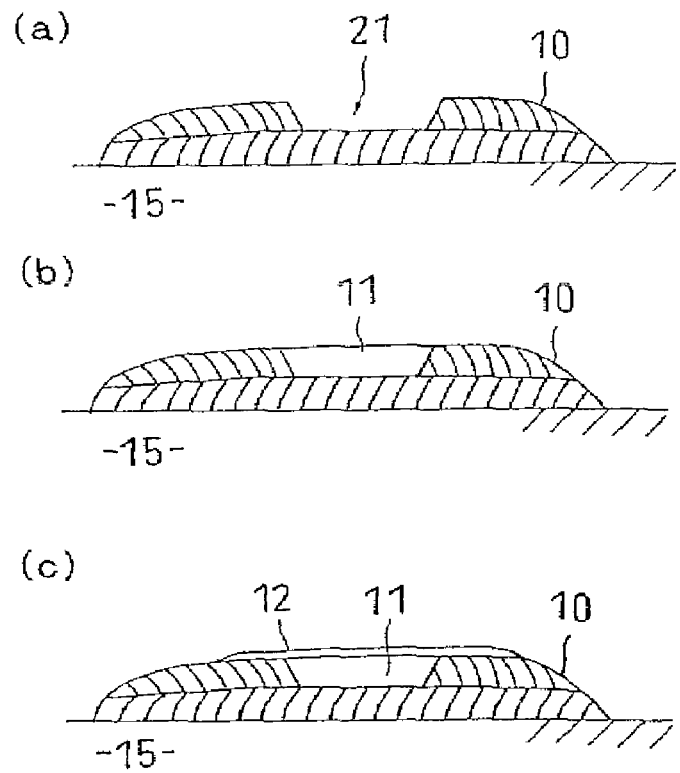
FIG. 3 is a sectional view showing a manner for forming the sidewall rubber.

When forming the sidewall rubber 20, an unvulcanized rubber composition for forming a black sidewall rubber 10 is supplied to the extruding apparatus 17. The unvulcanized rubber composition is extruded in the form of the rubber ribbon 14 and is supplied to the forming drum 15. The forming drum 15 rotates and drives in the R-direction in a state where a winding-start end of the rubber ribbon 14 is fixed, the forming drum 15 reciprocates in the direction of the rotation axis, thereby spirally winding the rubber ribbon 14 along the circumferential direction of the tire a plurality of times, and the black sidewall rubber 10 having a concave groove 21 as shown in FIG. 3(a) is formed. Although it is not illustrated in FIG. 3, the inner liner rubber 5 and the carcass ply are disposed on the outer periphery of the forming drum 15, and the black sidewall rubber 10 is formed on the outer periphery of the carcass ply.

The concave groove 21 is formed in an annular form along the circumferential direction of the tire in a region of the sidewall portion 2 where a white line or character is formed, i.e., in a region of the sidewall rubber 20 where the white rubber layer 8 is disposed. The concave groove 21 in this embodiment is of a substantially trapezoidal shape. An upper side of a cross section of the trapezoidal shape is longer than a lower side thereof, and its width is increased toward its opening. The black sidewall rubber 10 having such a concave groove 21 can be formed by appropriately controlling the number of rotations and the moving speed of the forming drum 15 toward the rotation axis. If the black sidewall rubber 10 is formed, the winding operation of the rubber ribbon 14 is completed, and the driving operations of the extruding apparatus 17 and the forming drum 15 are stopped.

Here, the rubber ribbon 14 comprises a narrow, thin and ribbon-like unvulcanized rubber composition, and its size can variously be changed in accordance with a kind and size of the tire. A cross section shape of the rubber ribbon 14 is not especially limited, and various and preferable shapes such as trapezoidal shape, crescentic shape and rectangular shape can be employed in accordance with need. Here, the unvulcanized rubber composition is composition obtained by mixing general rubber raw material such as natural rubber, styrene butadiene rubber (SBR), butadiene rubber (BR) and isoprene rubber (IR) and its mixing material with each other using a general method such that they can be heated and cross-linked. Various shapes such as ribbon-like shape, sheet-like shape, pellet-like shape and the like can be employed.

After the black sidewall rubber 10 is formed, as shown in FIG. 3(b), the white rubber extrudate 11 is fitted into the concave groove 21 and wound along the circumferential direction of the tire once. The white rubber extrudate 11 has a cross section shape corresponding to that of the concave groove 21, and is integrally extruded and formed through a substantially trapezoidal shape capsule. In this example, the white rubber extrudate 11 has a width of 20 to 70 mm, and a thickness of 2 to 5 mm.

The white rubber extrudate 11 is partially exposed and white line or character is formed thereon as will describe later. Position (cross section height of the tire) where the line or character is formed is varied depending upon a kind of the tire. Therefore, conventionally, when a sidewall rubber member is to be formed by extruding method, a portion thereof having color different from that of the main body rubber is made relatively wide so that various kinds of tires can be accepted, but this is disadvantageous in terms of anti-crack ability, weather resistance and costs. According to the present invention, when the black sidewall rubber 10 is to be formed, various kinds of tires can appropriately and easily be accepted by appropriately changing the position of the concave groove 21.

Figure 4:
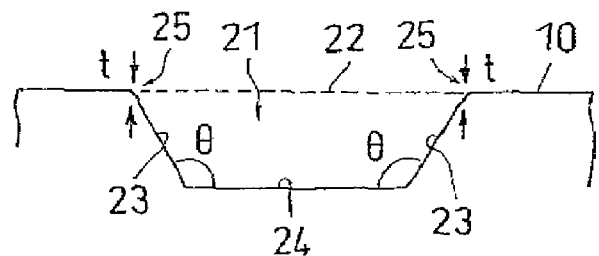
FIG. 4 is an enlarged sectional view of a vicinity of a concave groove.

The concave groove 21 is of substantially trapezoidal shape whose width is gradually increased toward its opening as described above, so that the white rubber extrudate 11 can easily be fitted into the concave groove 21. A slight surface step is generated in some cases in at a boundary between the black sidewall rubber 10 and the white rubber extrudate 11 fitted into the concave groove 21. Therefore, as shown in FIG. 4 in an enlarged manner, it is preferable that an end thickness t formed by an opening surface 22 and a side surface 23 of the concave groove 21 is 1 mm or less. With this, the surface step can be reduced. It is preferable that an angle θ formed between a bottom surface 24 and the side surface 23 of the concave groove 21 is 105° or more. With this, when the white rubber extrudate 11 is fitted, air in the concave groove 21 can easily escape, and air entering failure can be avoided.

After the white rubber extrudate 11 is fitted, as shown in FIG. 3(c), a rubber sheet 12 having the same color as that of the main body rubber is wound around the circumferential direction of the tire once, and the white rubber extrudate 11 is covered. The rubber sheet 12 has a width of 25 to 90 mm and thickness of 0.3 to 1.0 mm for example.

Figure 5:
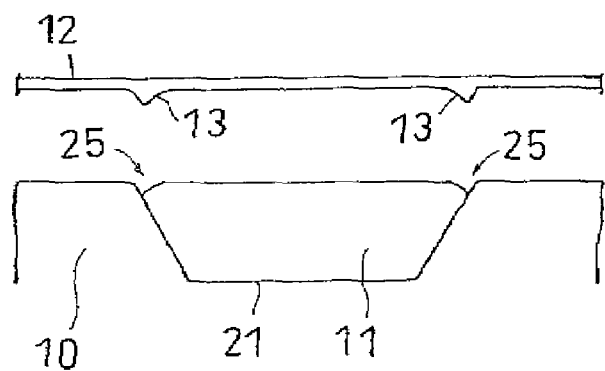
FIG. 5 is a sectional view showing a manner for covering a white rubber extrudate with a rubber sheet.

The rubber sheet 12 of this embodiment at its covering surface is provided with a pair of projection 13 as shown in FIG. 5. A distance between the projection 13 corresponds to an opening width of the concave groove 21. When the white rubber extrudate 11 is covered with the rubber sheet 12, the projection 13 are wound such as to be opposed to the opening edge 25. With this, it is possible to effectively reduce the surface step generated at a boundary between the black sidewall rubber 10 and the white rubber extrudate 11 fitted into the concave groove 21. The shape of the projection 13 is not especially limited, and a triangular shape, a semi-circular shape may be employed as in this embodiment. The rubber sheet 12 having such projection 13 can be obtained by extrusion for example.

After the white rubber extrudate 11 is covered with the rubber sheet 12, a pneumatic tire as shown in FIG. 1 is formed through the above-described predetermined procedures. That is, the black sidewall rubber 10, the white rubber extrudate 11 and the rubber sheet 12 become the black rubber layer 7, the white rubber layer 8 and the cover rubber layer 9, respectively. After the tire is vulcanized, the cover rubber layer 9 comprising the rubber sheet 12 is partially cut down by buffing, the white rubber layer 8 is partially exposed, and a white line or character (corresponding to the second color portion) is formed on the sidewall portion 2.

A portion having a color different from that of the main body rubber is not limited to white, and other colors may be employed. Although the sidewall rubber 20 is formed on the outer periphery of the carcass ply which is cylindrically disposed on the forming drum 15 in the above embodiment, a central portion of the carcass ply may be swelled and deformed into a tire shape.

Example of the Present Invention

An example tire which concretely shows the structure and effect of the present invention will be explained. The example of the present invention and the like were evaluated in the following manner.

(1) Productivity

Time required for forming tire including step changing based on change of tire size was measured, and productivity was evaluated. A comparative example 1 is set to 100 and a result is evaluated with indices, the more the numeric value is, the shorter the forming time is, i.e., the more excellent the productivity is.

(2) Outward Appearance of Tire

White line and character formed on the sidewall portion were observed, locations which can be regarded as deteriorating the outward appearance of the tire were counted, and the outward appearance of the tire was evaluated by deducting marks. The comparative example 1 is set to 100 and a result is evaluated with indices, the more the numeric value is, the number of locations which are regarded as deteriorating the tire outward appearance is smaller, i.e., the more excellent the tire outward appearance is.

(3) Uniformity

Based on a test method defined in JISD4233, RFV (radial force variation) was measured, and uniformity of a tire was evaluated. More specifically, a tire was pushed against a rotation drum such that a predetermined load is applied, and a variation amount of reaction force in a radial direction generated when the tire was rotated was measured while constantly maintaining a distance between both the shafts. The comparative example 1 is set to 100 and a result is evaluated with indices, the more the numeric value is, the smaller the variation amount is, i.e., the more excellent the uniformity is.

Comparative Example 1

Figure 6:
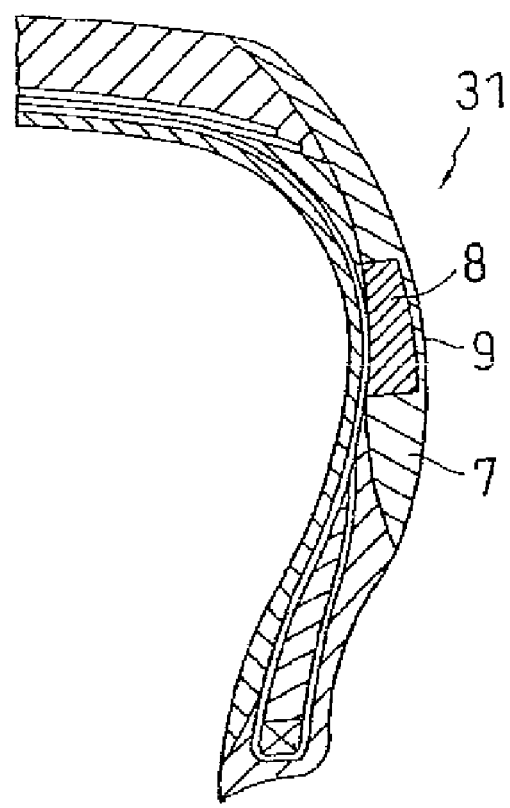
FIG. 6 is a sectional view showing a sidewall portion formed by a conventional producing method of a pneumatic tire.

Rubber members which became a black rubber layer and a white rubber layer were simultaneously extruded, a rubber sheet was pasted to its outer periphery to form a sidewall rubber member, and the sidewall rubber member was wound around the circumferential direction of the tire once, a test tire (tire size: P265/70R16111S) having a tire structure shown in FIG. 6 and formed with the sidewall rubber was produced as the comparative example 1.

Comparative Example 2

Rubber ribbons which became a black rubber layer and a white rubber layer were wound a plurality of times, a rubber sheet was pasted to its outer periphery to form a sidewall rubber, thereby forming a test tire (tire size: P265/70R16111S) having a tire structure shown in FIG. 6 and formed with the sidewall rubber as a comparative example 2.

Example of the Tire of the Present Invention

A rubber ribbon was wound a plurality of times as in the above-described embodiment, to form a black sidewall rubber, an extruded white rubber extrudate was fitted into a concave groove of the black sidewall rubber, a rubber sheet was pasted on its outer periphery, a test tire (tire size: P265/70R16111S) formed with the sidewall rubber and having the tire structure shown in FIG. 1 was produced as a tire of the present invention. Evaluation results of the test tires are shown in Table 1.

TABLE 1

|  | Productivity | Outward appearance of tire | Uniformity |
| --- | --- | --- | --- |
| Comparative example 1 | 100 | 100 | 100 |
| Comparative example 2 | 120 | 80 | 120 |
| Example of the tire of the present invention | 125 | 100 | 115 |

It was found that in the case of the comparative example 1, time required for changing the steps of the tire sizes is relatively long, and productivity is lower than that of the comparative example 2 and the example of the tire of the present invention. In the comparative example 2, profile of the white line or character was wavy, locations which were regarded as deteriorating the outward appearance were confirmed. In the comparative example 1 and the example of the tire of the present invention, such inconveniences were not found, and outward appearance of the tire was excellent. It was found that the uniformity was most excellent in the comparative example 2, the example of the tire of the present invention made full use of merits of the ribbon winding method, and uniformity was secured.

What is claimed is:

1. A producing method of a pneumatic tire in which at least one side of a sidewall portion is formed with a second color portion of second color that is different from that of a main body rubber of first color, the producing method comprising steps of:
    winding a rubber ribbon of the first color along a circumferential direction of the tire a plurality of times, thereby forming a first color sidewall rubber;
    providing a concave groove extending in the circumferential direction of the tire in a region where the second color portion is formed in the first color sidewall rubber;
    fitting a second color rubber extrudate of the second color which is monolithically extruded such that said extrudate fits into the concave groove and winding the same along the circumferential direction of the tire once;
    winding a rubber sheet of the first color along the circumferential direction of the tire once to cover the second color rubber extrudate with the rubber sheet, and
    partially cutting down the rubber sheet to expose the second color rubber extrudate to form the second color portion,
    wherein when the second color rubber extrudate is covered with the rubber sheet, projections provided on a covered surface of the rubber sheet are opposed to edges of the concave groove.

2. The producing method of the pneumatic tire according to claim 1, wherein a width size of the concave groove is increased toward its opening side.

3. The producing method of the pneumatic tire according to claim 2, wherein a cross section shape of the concave groove when it is cut at a tire meridian is of substantially trapezoidal shape, a surface step at boundary between the first color sidewall rubber and the second color rubber extrudate is generated at an end of the concave groove, a thickness of the surface step is 1 mm or less, and an angle formed between the side surface and a bottom surface of the concave groove is 105° or more.

4. A method of producing a pneumatic tire formed with a main body rubber of a first color and having a second color portion of a second color that is different from the first color, said second color portion being provided in at least one sidewall portion, said method comprising:
    winding a rubber ribbon of the first color along a circumferential direction of the tire a plurality of times, thereby forming a first color sidewall rubber;
    controlling the winding of the rubber ribbon to form a concave groove extending in the circumferential direction of the tire in a region where the second color portion is to be formed;
    providing a second color rubber extrudate of the second color which is monolithically extruded in a shape capable of being fitted into the concave groove;
    winding the second color rubber extrudate in the concave groove along the circumferential direction of the tire once;
    winding a rubber sheet of the first color along the circumferential direction of the tire once to cover the second color rubber extrudate with the rubber sheet; and
    partially removing the rubber sheet to expose the second color rubber extrudate to form the second color portion,
    wherein when the second color rubber extrudate is covered with the rubber sheet, projections provided on a covered surface of the rubber sheet are opposed to edges of the concave groove.

5. The method according to claim 4, wherein the concave groove is formed such that a width of the concave groove is increased outwardly.

6. The method according to claim 5, wherein the concave groove is formed such that a cross sectional shape of the concave groove when it is cut at a tire meridian is of substantially trapezoidal shape, a surface step at boundary between the first color sidewall rubber and the second color rubber extrudate is generated at an end of the concave groove, a thickness of the surface step is 1 mm or less, and an angle formed by the side surface and a bottom surface of the concave groove is 105° or more.

* * * * *

UNITED STATES PATENT AND TRADEMARK OFFICE
CERTIFICATE OF CORRECTION

PATENT NO.       : 7,641,751 B2
APPLICATION NO.  : 11/382985
DATED            : January 5, 2010
INVENTOR(S)      : Kazuma Nishitani It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 757 days.

Signed and Sealed this

Sixteenth Day of November, 2010

David J. Kappos
*Director of the United States Patent and Trademark Office*